United States Patent
Klemetti et al.

(10) Patent No.: US 10,122,640 B2
(45) Date of Patent: Nov. 6, 2018

(54) MINIMAL BUFFER NETWORK ARBITER

(71) Applicant: LiveQoS Inc., Ottawa (CA)

(72) Inventors: Miika Anttoni Klemetti, Kanata (CA);
Yuri Nebogatov, Kanata (CA);
Matthew Robert Williams, Kanata (CA)

(73) Assignee: LiveQos Inc., Ottawa (CA)

( * ) Notice: Subject to any disclaimer, the term of this patent is extended or adjusted under 35 U.S.C. 154(b) by 523 days.

(21) Appl. No.: 14/605,498

(22) Filed: Jan. 26, 2015

(65) Prior Publication Data
US 2016/0218986 A1 Jul. 28, 2016

(51) Int. Cl.
*H04L 12/835* (2013.01)
*H04L 29/08* (2006.01)
*H04L 29/06* (2006.01)
*H04L 12/913* (2013.01)
*H04L 12/841* (2013.01)

(52) U.S. Cl.
CPC .............. *H04L 47/30* (2013.01); *H04L 47/28* (2013.01); *H04L 47/724* (2013.01); *H04L 65/605* (2013.01); *H04L 67/2842* (2013.01)

(58) Field of Classification Search
CPC ..... H04L 47/30; H04L 67/2842; H04L 47/28; H04L 47/724; H04L 65/605
See application file for complete search history.

(56) References Cited

U.S. PATENT DOCUMENTS

| | | | | |
|---|---|---|---|---|
| 9,455,927 | B1 * | 9/2016 | Nayak | H04L 47/522 |
| 2009/0055550 | A1 * | 2/2009 | Way | H04L 47/10 |
| | | | | 709/233 |
| 2010/0239255 | A1 * | 9/2010 | Ikeda | H04J 3/1694 |
| | | | | 398/66 |
| 2013/0215746 | A1 * | 8/2013 | Bhooma | H04L 41/5022 |
| | | | | 370/235 |
| 2013/0215750 | A1 * | 8/2013 | Beecroft | H04L 47/11 |
| | | | | 370/235 |
| 2014/0304320 | A1 * | 10/2014 | Taneja | H04L 69/16 |
| | | | | 709/203 |

OTHER PUBLICATIONS

APPEX Networks, Bidirectional, Prioritized and Fair Bandwidth Regulation, Copyright 2012, 9 pages.
APPEX Networks, Video Streaming Without Interruption,Adaptive bitrate and content delivery networks: Are they enough to achieve high quality, uninterrupted internet video streaming?, 6 pages, copyright 2013.
APPEX Networks, Zeta TCP, An Intelligent Approach to Transport Acceleration, Copyright 2012, 8 pages.

* cited by examiner

*Primary Examiner* — Kim T Nguyen
(74) *Attorney, Agent, or Firm* — Stratford Managers Corporation (57) ABSTRACT

A network arbiter and associated method for linking and controlling the rate of data transmission between a sender on a connected network and a client with an advertised receive window are disclosed. The network arbiter comprises a downstream temporary storage for temporarily storing data in transmission from the sender to the client, an upstream temporary storage for temporarily storing data in transmission from the client to the sender and a processor operatively connected to the downstream temporary storage and the upstream temporary storage. The processor is configured to alter the advertised receive window in order to modulate the rate of data transmission.

22 Claims, 6 Drawing Sheets

MINIMAL BUFFER NETWORK ARBITER

FIELD OF THE INVENTION

The present disclosure relates to management of data transmission flows. More specifically, it relates to a device and associated method of controlling data transmission rates to reduce required buffer size and associated latency that can be implemented at the receiving end of the transmission.

BRIEF SUMMARY

A network arbiter for linking and controlling the rate of data transmission between a sender on a connected network and a client with an advertised receive window is disclosed. The network arbiter comprises a downstream temporary storage for temporarily storing data in transmission from the sender to the client, an upstream temporary storage for temporarily storing data in transmission from the client to the sender and a processor operatively connected to the downstream temporary storage and the upstream temporary storage. The processor is configured to alter the advertised receive window in order to modulate the rate of data transmission.

In another embodiment, the processor is configured to determine a) a round trip time between the client and the sender, b) determine a downstream channel capacity between the network arbiter and the client, c) calculate a bandwidth delay product from the round trip time and the downstream channel capacity and d) alter the advertised receive window to be equal to the calculated bandwidth delay product.

In another embodiment, the processor repeats steps a) to d) when a prescribed condition is met.

In another embodiment, the prescribed condition is the passage of a preset amount of time.

In another embodiment, the prescribed condition is the reception of a preset number of data packets.

In another embodiment, the prescribed condition is the downstream temporary storage filling to a prescribed level.

In another embodiment, the downstream channel capacity is a preset value.

In another embodiment, the downstream channel capacity is determined dynamically by the processor according to traffic conditions.

In another embodiment, the bandwidth delay product is calculated by multiplying the round trip time by the downstream channel capacity.

In another embodiment, the processor alters the advertised receive window by overwriting the value in an acknowledgement data packet sent by the client.

In another embodiment, the processor is configured to apply a random early discard packet dropping algorithm if the downstream temporary storage nears saturation.

A method of controlling the rate of data transmission between a sender on a connected network and a client with an advertised receive window is also disclosed. The method comprises a) determining a round trip time between the client and the sender, b) determining a downstream channel capacity between the network arbiter and the client, c) calculating a bandwidth delay product from the round trip time and the downstream channel capacity and d) altering the advertised receive window to be equal to the calculated bandwidth delay product.

In another embodiment, steps a-d are repeated when a prescribed condition is met.

In another embodiment, the prescribed condition is the passage of a preset amount of time.

In another embodiment, the prescribed condition is the reception of a preset number of data packets.

In another embodiment, the prescribed condition is a downstream temporary storage filling to a prescribed level.

In another embodiment, the downstream channel capacity is a preset value.

In another embodiment, the downstream channel capacity is determined dynamically according to traffic conditions.

In another embodiment, the bandwidth delay product is calculated by multiplying the round trip time by the downstream channel capacity.

In another embodiment, the advertised receive window is altered by overwriting the value in an acknowledgement data packet sent by the client.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Figure 1:
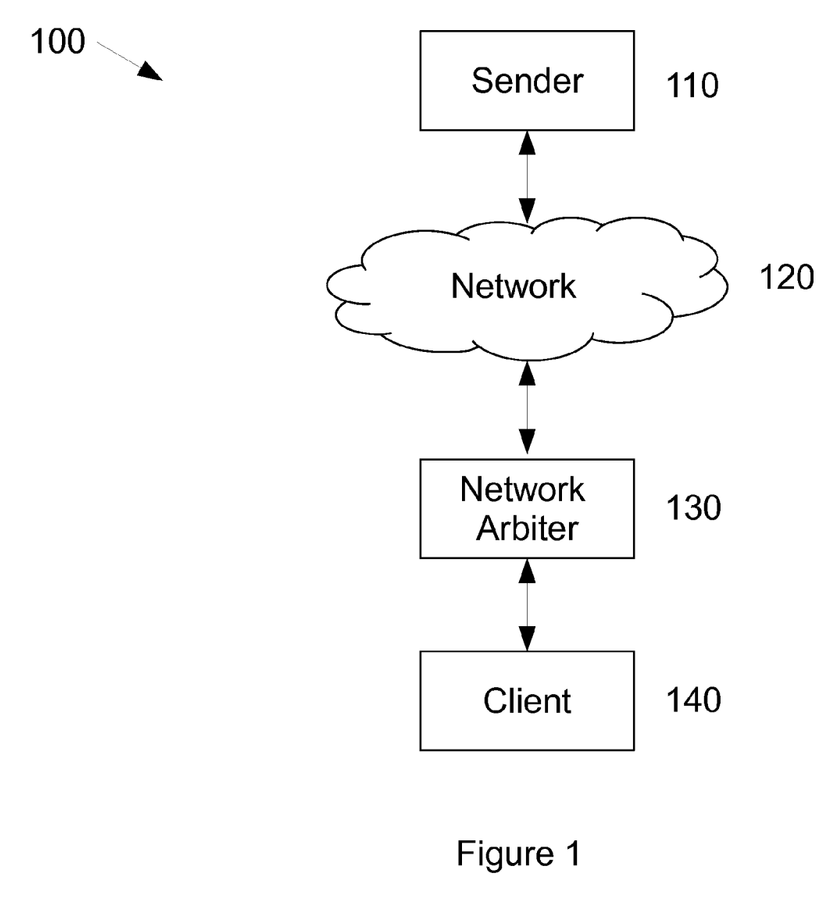
FIG. 1 is a block diagram of a data transmission system.

FIG. 1 shows a block diagram of a data transmission system 100 including a sender 110, network 120, network arbiter 130 and client 140. Sender 110 may be any device functioning as a data server connected to network 120 and able to receive requests and transmit data in response. Network 120 may be any data transmission infrastructure, for example, a LAN or the internet. Network arbiter 130, details of which are discussed below, is positioned between network 120 and client 140. Client 140 may be any computing device able to request data, receive data and acknowledge receipt. Client 140 may also comprise a network of such devices such as a corporate intranet or a home network, so long as data communication between client 140 and network 120 is routed through network arbiter 130.

In a typical operation, client 140 requests data from sender 110. The request travels to network arbiter 130, through network 120 to sender 110. Sender 110 then transmits the requested data through network 120 to client 140 via network arbiter 130. In a TCP environment the requested data is broken into packets at sender 110 to be transmitted over network 120 and reassembled at client 140. In order to avoid mistakes of transmission and to correct errors, when client 140 receives a packet it sends back an acknowledgement packet. Data that has been sent, but not yet acknowledged is said to be "in flight." In a typical implementation client 140 advertises a Receive Window corresponding to the amount of data it is ready to receive, typically by including information about the size of the Receive Window in the initial data request and subsequent acknowledgment packets. Sender 110 typically responds by limiting the amount of data in flight to the size of the Receive Window so as not to accidentally cause an overflow and consequent data loss.

Often, there is a limit to the rate of data transfer between sender 110 and client 140. For example, customers of an ISP may pay for a particular data transfer rate. In this situation, the "last hop" to the client's premises is likely to be a bottleneck where the advertised Receive Window is typically much larger than is necessary to saturate the connection between the ISP and the customer. Consequently, an incoming data stream will be need to be buffered by the ISP and fed to client 140 only at the allowable rate. This can result in bufferbloat, high latency, jitter and otherwise degraded performance, especially for real-time traffic such as VOIP telephony.

Figure 2:
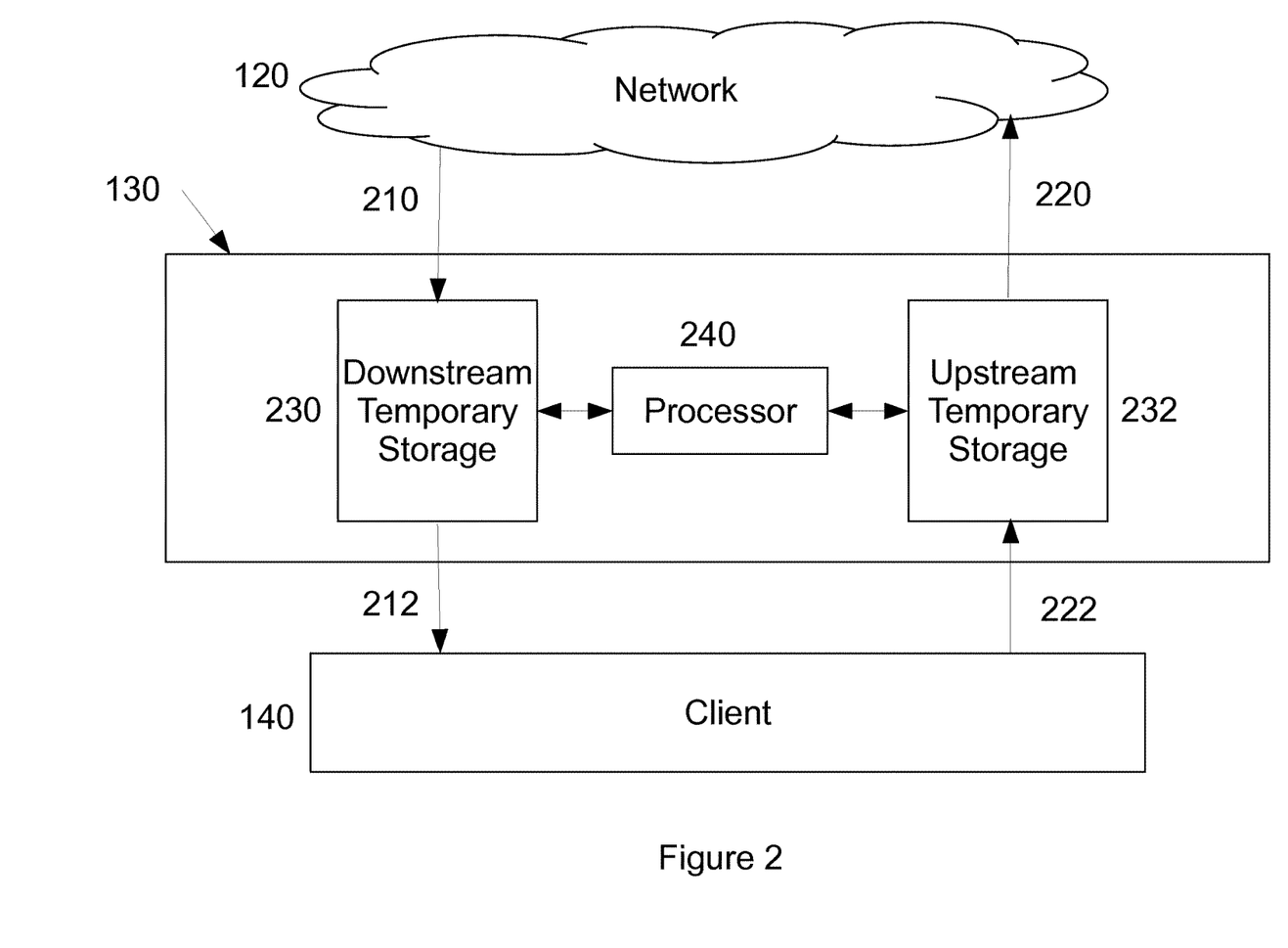
FIG. 2 is a block diagram of a network arbiter.

FIG. 2 shows a block diagram of network arbiter 130 including downstream 210, 212 and upstream 220, 222 connections with network 120 and client 140, respectively. Downstream traffic passes from network 120 through downstream connection 210 to network arbiter 130 where it is stored in downstream temporary storage 230 until transmission to client 140 via downstream connection 212. Similarly, upstream traffic passes from client 140 through upstream connection 222 to network arbiter 130 where it is stored in upstream temporary storage 232 until transmission to network 120 via upstream connection 220. Processor 240 monitors the contents of downstream and upstream temporary storage 230, 232 and may alter the contents according to the methods described below.

Figure 3A:
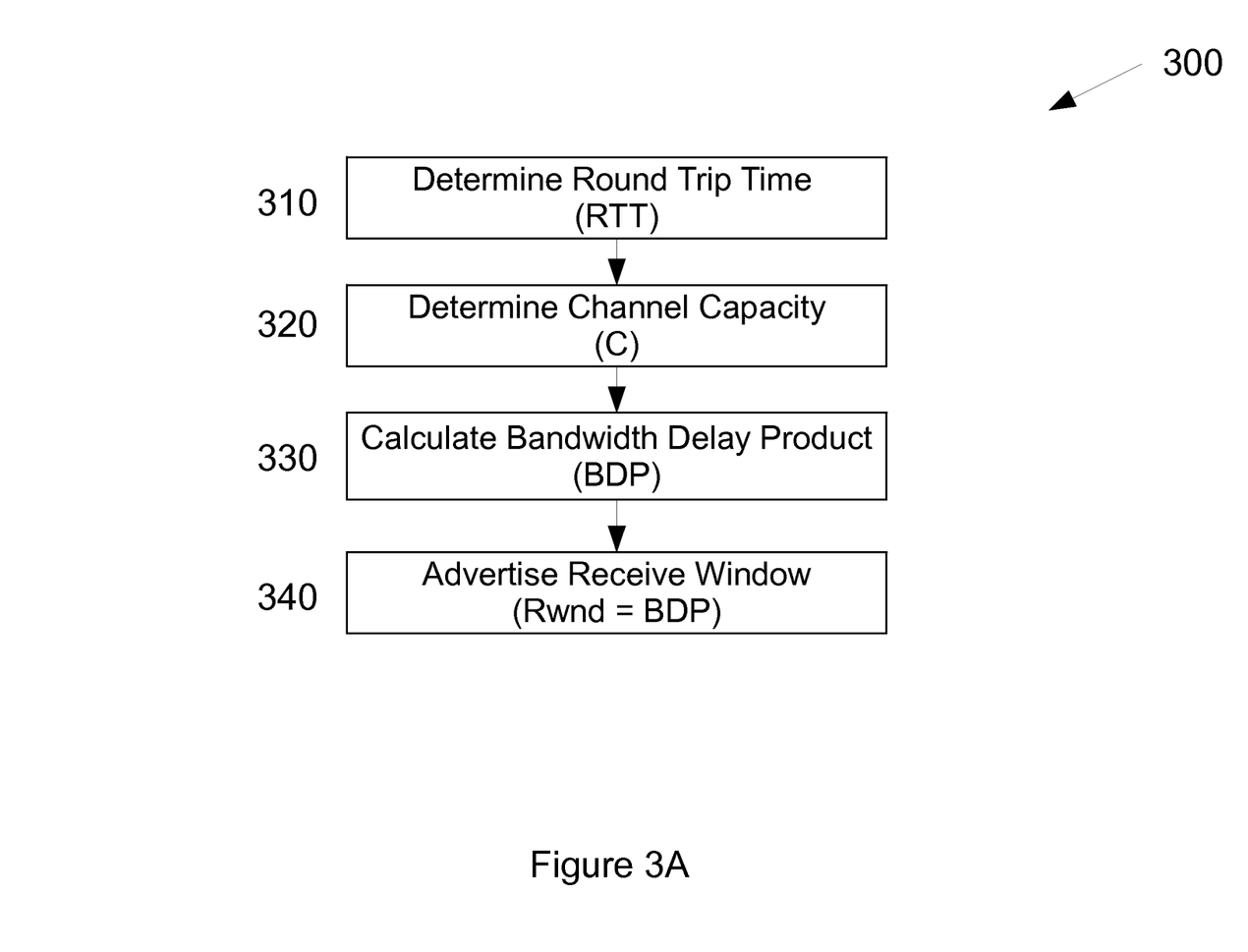
FIG. 3A shows a flow chart of a method for controlling the data transfer rate of a data stream implemented by a network arbiter.

FIG. 3A shows a flow chart of a method 300 for controlling the data transfer rate of a data stream implemented by a network arbiter. Method 300 is implemented on network arbiter 130, using processor 240 to alter the contents of upstream temporary storage 232. Methods below will be explained using a single data stream as an example, but it is to be understood that network arbiter 130 is typically managing multiple data streams and that the methods described can be used with any number of individual data streams.

At 310, the Round Trip Time (RTT) between client 140 and sender 110 is determined. RTT is a measured quantity depending on the properties of network 130, for example, transmission delays, switching/routing delays and buffering delays. Since processor 240 is monitoring the contents of downstream and upstream temporary storage 230, 232, an estimate of RTT can be found by recording data packet and acknowledgement arrival times and matching sequence/acknowledgement numbers. Since network arbiter 130 will be located near to client 140, a reasonable estimate of RTT can be found using the round trip time between network arbiter 130 and sender 110 rather than the round trip time between client 140 and sender 110. Typically, this will result in an estimate within a few percent of the true value of RTT and will be adequate for the purpose described below.

At 320, the channel capacity (C) of downstream connection 212 between network arbiter 130 and client 140 is determined. It should be noted that this is not the total transmission capacity of downstream connection 212. Rather, C is the portion of the total transmission capacity reserved for the data stream in question. It may be capped artificially, such as when a customer has paid for a particular bandwidth. C may also be a function of hardware constraints or traffic congestion in a multi-data stream environment and therefore subject to change. The case of multiple data stream is described below.

At 330, the Bandwidth Delay Product (BDP) is calculated. BDP represents the target amount of data in flight for a particular data stream at a particular time. It is calculated so that data sent by sender 110 arrives at network arbiter 130 at the same rate that downstream connection 212 to client 140 can accept data, thereby minimizing the use of downstream temporary storage 230. One way that BDP may be calculated is by multiplying:

$$BDP = RTT * C$$

At 340, the advertised Receive Window (Rwnd) is set equal to the BDP value calculated at 330. For example, processor 240, may alter the contents of the initial data request and subsequent acknowledgment packets stored in upstream temporary storage 232 sent by client 140 and overwrite the value for Rwnd before continuing transmission.

Figure 3B:
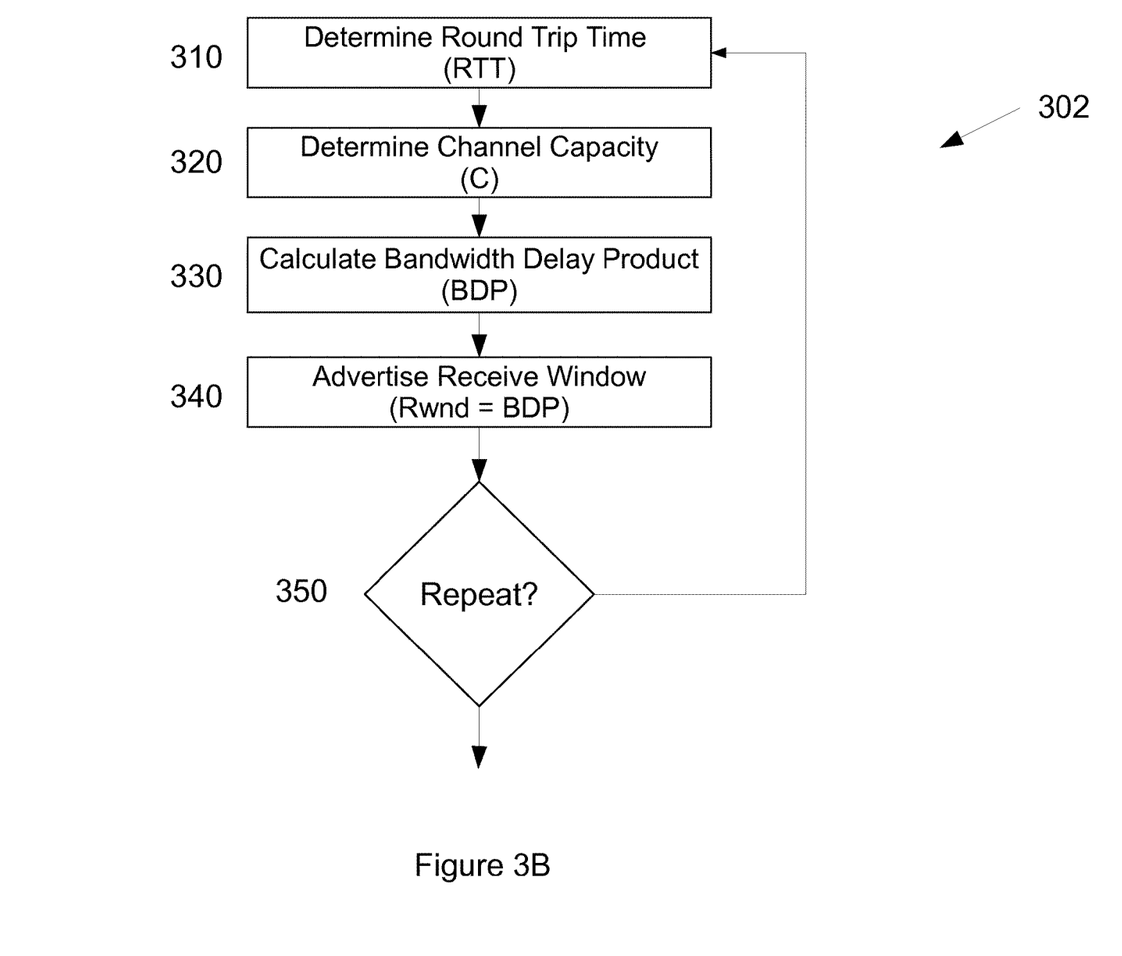
FIG. 3B shows a flow chart of another method for controlling the data transfer rate of a data stream implemented by a network arbiter.

FIG. 3B shows a flow chart of a method 302 for controlling the data transfer rate of a data stream implemented by a network arbiter. It is analogous to method 300 except for step 350. At 350, a determination is made regarding when and if to repeat steps 310-340. This determination may be based on any appropriate condition being met. For example, repetition could be triggered whenever a preset period of time has elapsed or when a preset number of data packets have been received. A repetition may also be triggered by the reception of a new measurement of RTT or a change in C. More complex conditions, reflecting the network environment can also be used. For example, repetition may be triggered by incoming buffer conditions. For example, downstream temporary storage 230 filling to a prescribed level may be taken as an indication that BDP should be recalculated.

In a typical application downstream connection 212 is the bottleneck, "last hop," connection that limits the overall data transfer rate. In a prior art implementation the advertised Receive Window of a client would be large, which would result in the sender putting a similarly large amount of data in flight, typically more than the "last hop" downstream connection is able to accommodate. Accordingly, the data stream needs to be buffered before the "last hop." In contrast, when network arbiter 130 is implemented, the advertised Receive Window of client 140 is calibrated to the available bandwidth in downstream connection 212 and will typically be smaller than an uncalibrated Receive Window. Accordingly, when the data in flight reaches downstream temporary storage 230 all of it can proceed directly through downstream connection 212 to client 140. Any delay in the data stream caused by downstream temporary storage 230 is almost entirely due to packet inspection rather than buffering functions leading to a reduction in the amount of memory required by buffers and an associated reduction in latency.

Secondary measures can also be employed in the event that downstream temporary storage 230 approaches saturation, due to occasional bursts in traffic. For example, a packet dropping algorithm may be used. Preferably, the secondary measure is a version of the Random Early Discard (RED) algorithm, where the probability of discarding each incoming packet increases as the buffer nears saturation.

Multiple Data Streams

The above description assumed a single data stream. Typically, there will be many data streams passing through network arbiter 130 simultaneously. In the case of multiple data streams, the methods above are applied to each data stream individually.

Figure 4:
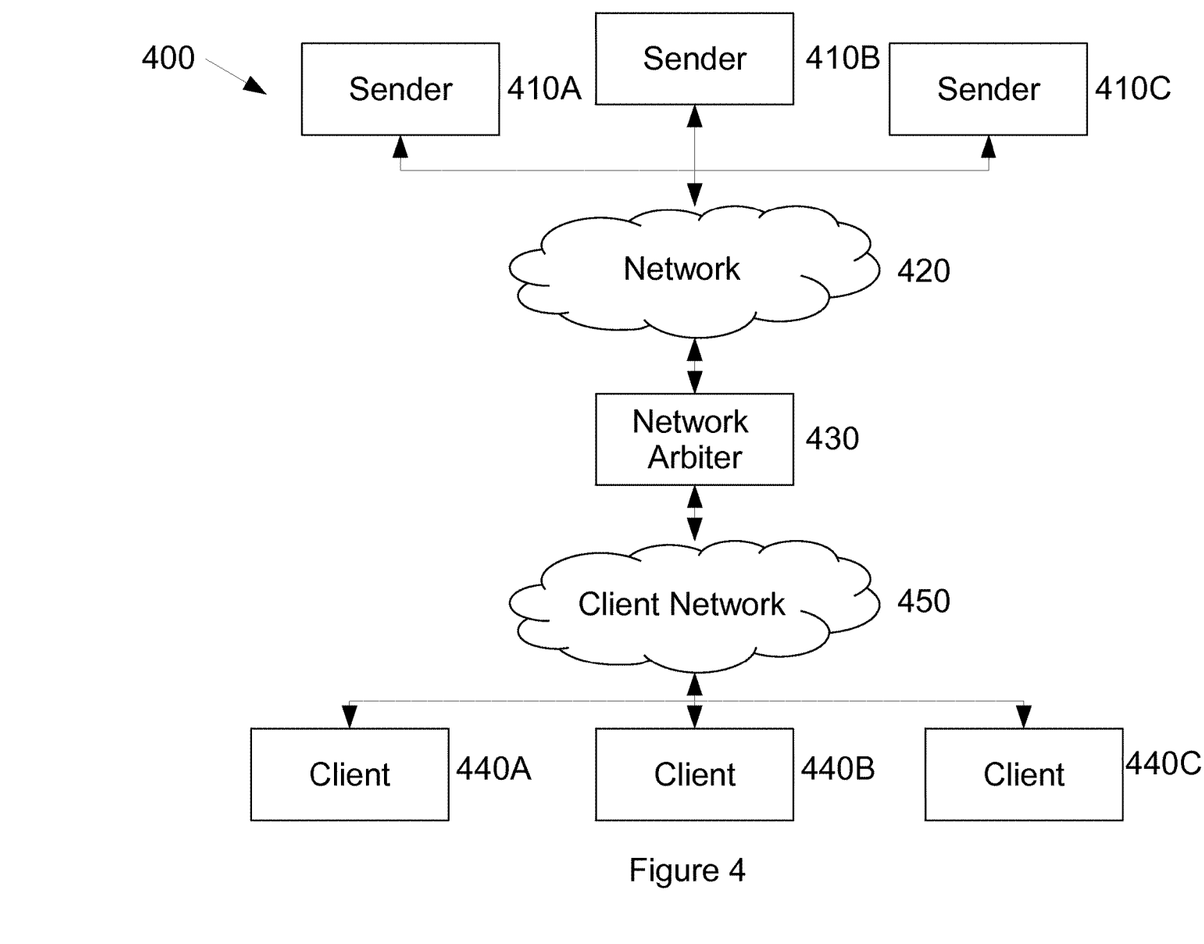
FIG. 4 is a block diagram of a data transmission system with multiple senders and clients.

FIG. 4 is a block diagram of a data transmission system with multiple senders and clients. Parts labeled with similar numbers are analogous to parts from FIG. 1. Senders 410A, 410B, 410C may each be any device functioning as a data server connected to network 420 and able to receive requests and transmit data in response. Network 420 may be any data transmission infrastructure, for example, a LAN or the internet. Network arbiter 430, details of which were discussed above, is positioned between network 420 and client network 450. Clients 440A, 440B, 440C may each be any computing device able to request data, receive data and acknowledge receipt. In the example illustrated, clients 440A, 440B, 440C are shown connected to network arbiter 430 through client network 450, which may be any internal network infrastructure such as a corporate intranet or a home network, so long as data communication between clients 440A, 440B, 440C and network 420 is routed through network arbiter 430. Although three pairs of senders 410A, 410B, 410C and clients 440A, 440B, 440C are shown, it is to be understood that that any number of such pairings are possible.

Figure 5:
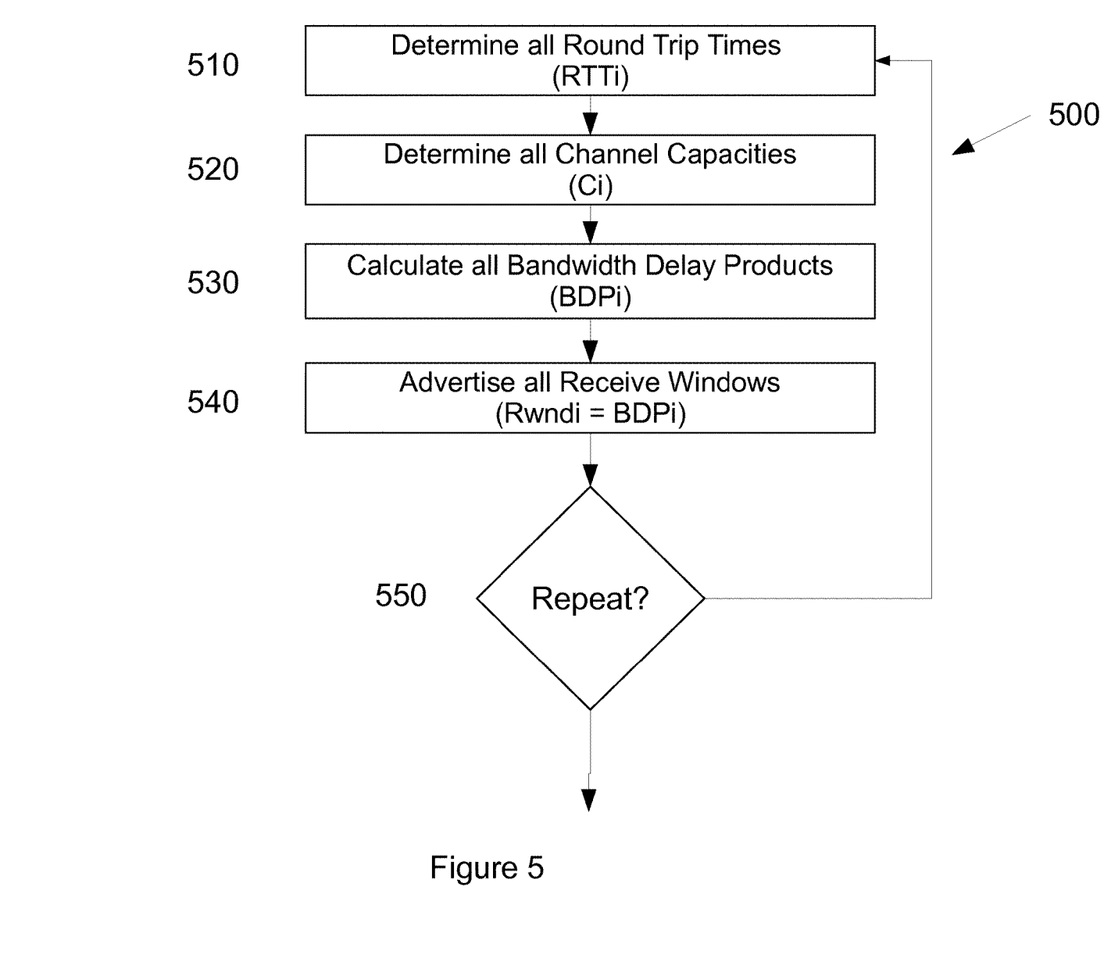
FIG. 5 shows a flow chart of a method for controlling the data transfer rate of multiple data streams implemented by a network arbiter.

FIG. 5 shows a flow chart of a method 500 for controlling the data transfer rate of multiple data streams implemented by a network arbiter 430. Method 500 here is shown as analogous to method 302 and similar numbers represent similar steps, except that at each step in method 500, the step is performed for all data streams.

At 510, the Round Trip Time (RTTi) for each currently active data stream between clients 440A, 440B, 440C and senders 410A, 410B, 410C is determined, as described above. It should be noted that each RTTi will typically have a different value since network conditions are path dependent and will vary with time and with which sender-client pair is being measured.

At 520, the channel capacity (Ci) for each data steam is determined. Since each Ci is the portion of the total transmission capacity reserved for the data stream in question, a way to divide up the total managed capacity of downstream connection 212 must be specified. One possibility is simply to assign an equal amount of bandwidth to each data stream, so that for n data streams:

$$C_i = \frac{1}{n} C_0$$

where $C_i$, is the channel capacity for a particular data stream, n is the number of data streams and $C_0$ is the total managed capacity.

It should be noted that the total managed capacity $C_0$ may be equal or less than the total transmission capacity of downstream connection 212. A portion of the total transmission capacity may be inaccessible to the methods described herein if it consists of unmanaged data flows, for example, non-TCP traffic. If the unmanaged data flows are large and/or variable they may affect the total managed capacity. As such, a method of measuring changes in the total managed capacity may be desirable, to insure that the allocated bandwidth does not exceed the managed bandwidth.

A weighting scheme could also be employed whereby each data stream is allocated a greater or lesser portion of the total managed capacity. For example, each data stream could be assigned a weight, $W_i$, and a corresponding channel capacity, $C_i$, with $$C_i = \frac{W_i}{W_0} C_0$$

and, $$W_0 = \sum_{i=2}^{n} W_i$$

where, $W_0$ is the sum of the weights, $W_i$, of all currently active data streams.

It may also be desirable to include a guard band; a portion of the total managed capacity not dedicated to a particular data stream, but held in reserve to handle unexpected bursts. Regardless of the weighting scheme chosen, the following must remain true:

$$C_0 = C_g + \sum_{i=1}^{n} C_i = C_g + \sum_{i=1}^{n} \frac{BDP_i}{RTT_i}$$

where, $C_0$ is the total managed capacity, $C_i$ is the channel capacity of a data stream and $C_g$ is channel capacity allocated to a guard band, $BDP_i$ is the calculated BDP of a data stream and $RTT_i$ is the measured RTT of a data stream.

At 530, the Bandwidth Delay Product ($BDP_i$) is calculated for each data stream. BDPi may be calculated by multiplying:

$$BDP_i = RTT_i * C_i$$

At 540, the advertised Receive Window ($Rwnd_i$) for each data steam is set equal to the $BDP_i$ value calculated at 530. For example, processor 240, may alter the contents of the initial data request and subsequent acknowledgment packets stored in upstream temporary storage 232 sent by clients 440A, 440B, 440C and overwrite the value for $Rwnd_i$ before continuing transmission.

At 550, a determination is made regarding when and if to repeat steps 510-540. As with a single data stream, this determination may be based on any appropriate condition being met. For example, repetition could be triggered whenever a preset period of time has elapsed or when a preset number of data packets have been received. A repetition may also be triggered by the reception of a new measurement of $RTT_i$ or a change in $C_i$ or the total managed capacity. More complex conditions, reflecting the network environment can also be used. For example, in a high traffic environment, with multiple managed data streams beginning and ending continuously it may be desirable to repeat every time a new data stream begins or an existing data stream ends. Repetition can also be triggered by incoming buffer conditions. For example, downstream temporary storage 230 filling to a prescribed level may be taken as an indication that BDP should be recalculated.

Secondary measures can also be employed in the event that downstream temporary storage 230 approaches saturation, due to occasional bursts in traffic. For example, a packet dropping algorithm may be used. Preferably, the secondary measure is a version of the Random Early Discard (RED) algorithm, where the probability of discarding each incoming packet increases as the buffer nears saturation. In the case of multiple data streams the RED algorithm can be applied such that the probability of dropping a packet is influenced by the degree of buffer saturation as well as the weighting scheme that allocates bandwidth between data streams.

Consider an example where the total managed capacity is 10 Mb/s, a guard band of 1 Mb/s is to be maintained and there are three data streams, A, B and C. Consider further than a weighting scheme is used and the data streams are assigned weights of 50, 30 and 10, respectively.

At 510, $RTT_i$ values are measured to be:
$RTT_A$=150 ms
$RTT_B$=325 ms
$RTT_C$=90 ms At 520, channel capacities are determined. According to the weighting scheme described above, when all three data streams are active, the guard band and channel capacity for each will be:
$C_A$=5 Mb/s
$C_B$=3 Mb/s
$C_C$=1 Mb/s
$C_g$=1 Mb/s At 530, BDP for each data stream is calculated.
$BDP_A$=$RTT_A$*$C_A$=0.75 Mb
$BDP_B$=$RTT_B$*$C_B$=0.975 Mb
$BDP_C$=$RTT_C$*$C_C$=0.09 Mb At 540, the advertised Receive Window for clients 440A, 440B, 440C are altered to reflect the calculated BDP values.
$Rwnd_A$=$BDP_A$=0.75 Mb
$Rwnd_B$=$BDP_B$=0.975 Mb
$Rwnd_C$=$BDP_C$=0.09 Mb At 550, a determination is made regarding repetition of steps 510-540.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A network arbiter for minimizing buffering by controlling a rate of packet data transmission between a sender and a client connected to a network, the network arbiter comprising:
   an advertised receive window of a predetermined size expressed in one of bytes or number of packets;
   a downstream temporary storage for temporarily storing data in transmission from the sender to the client;
   an upstream temporary storage for temporarily storing data in transmission from the client to the sender; and
   a processor, operatively connected to the downstream temporary storage and the upstream temporary storage, the processor configured to alter the predetermined size of the advertised receive window in order to modulate the rate of packet data transmission of the data temporarily stored in the downstream temporary storage and the data temporarily stored in the upstream temporary storage.

2. The network arbiter of claim 1 wherein the processor is configured to:
   a. determine a round trip time between the client and the sender;
   b. determine a downstream channel capacity between the downstream temporary storage and the client;
   c. calculate a bandwidth delay product from the round trip time and the downstream channel capacity; and
   d. alter the size of the advertised receive window to a number of bytes equal to the calculated bandwidth delay product.

3. The network arbiter of claim 2 wherein the processor repeats steps a to d when a prescribed condition is met.

4. The network arbiter of claim 3 wherein the prescribed condition is a passage of a preset amount of time.

5. The network arbiter of claim 3 wherein the prescribed condition is a reception of a preset number of data packets.

6. The network arbiter of claim 3 wherein the prescribed condition 1 s the downstream temporary storage filling to a prescribed level.

7. The network arbiter of claim 2 wherein the downstream channel capacity is a preset value.

8. The network arbiter of claim 2 wherein the downstream channel capacity is determined dynamically by the processor according to traffic conditions.

9. The network arbiter of claim 2 wherein the bandwidth delay product is calculated by multiplying the round trip time by the downstream channel capacity.

10. The network arbiter of claim 2 wherein the processor alters the size of the advertised receive window by overwriting a value in an acknowledgement data packet sent by the client.

11. The network arbiter of claim 1 wherein the processor is configured to apply a random early discard packet dropping algorithm if the downstream temporary storage nears saturation.

12. A method of minimizing buffering of a data stream through control of a rate of packet data transmission between a sender and a client connected to a network, the method comprising:
    setting a size of an advertised received window in one of number of bytes or number of packets;
    temporarily storing data in transmission from the sender to the client, in a downstream temporary storage;
    temporarily storing data in transmission from the client to the sender, in an upstream temporary storage; and
    altering the size of the advertised received window of said client in order to modulate the rate of data transmission of the data temporarily stored in the downstream temporary storage and the data temporarily stored in the upstream temporary storage.

13. The method of claim 12 which includes:
    a. determining a round trip time between the client and the sender;
    b. determining a downstream channel capacity between the network arbiter and the client;
    c. calculating a bandwidth delay product from the round trip time and the downstream channel capacity; and
    d. altering the size of the advertised receive window to be equal to the calculated bandwidth delay product.

14. The method of claim 13 wherein steps a-d are repeated when a prescribed condition is met.

15. The method of claim 14 wherein the prescribed condition is a passage of a preset amount of time.

16. The method of claim 14 wherein the prescribed condition is a reception of a preset number of data packets.

17. The method of claim 14 wherein the prescribed condition is a downstream temporary storage filling to a prescribed level.

18. The method of claim 13 wherein the downstream channel capacity is a preset value.

19. The method of claim 13 wherein the downstream channel capacity is determined dynamically according to traffic conditions.

20. The method of claim 13 wherein the bandwidth delay product is calculated by multiplying the round trip time by the downstream channel capacity.

21. The method of claim 12 wherein the size of the advertised receive window is altered by overwriting a value in an acknowledgement data packet sent by the client.

22. The method of claim 12 wherein a random early discard packet dropping algorithm is applied if the downstream temporary storage nears saturation.

* * * * *